(12) United States Patent
Capone (10) Patent No.: US 8,070,399 B2
(45) Date of Patent: Dec. 6, 2011

(54) DRILL POINT FOR ONE-SHOT DRILLING OF SANDWICH PANELS AND SIMILAR

(76) Inventor: Natalino Capone, Montemiletto (IT)

( * ) Notice: Subject to any disclaimer, the term of this patent is extended or adjusted under 35 U.S.C. 154(b) by 859 days.

(21) Appl. No.: 11/920,233

(22) PCT Filed: May 15, 2006

(86) PCT No.: PCT/IB2006/051518
§ 371 (c)(1),
(2), (4) Date: May 30, 2008

(87) PCT Pub. No.: WO2006/120654
PCT Pub. Date: Nov. 16, 2006

(65) Prior Publication Data
US 2009/0067943 A1    Mar. 12, 2009

(30) Foreign Application Priority Data
May 13, 2005    (IT) .............................. RM2005A0238

(51) Int. Cl.
*B23B 51/02*    (2006.01)
(52) U.S. Cl. ......................... 408/230; 408/144; 408/224
(58) Field of Classification Search .................... 408/57, 408/59, 144, 224–225, 227, 230; *B23B 51/02*
See application file for complete search history.

(56) References Cited

U.S. PATENT DOCUMENTS

| | | | |
|---|---|---|---|
| 3,019,673 A | 2/1962 | Sjostrand et al. | |
| 4,556,347 A * | 12/1985 | Barish | 408/230 |
| 4,898,503 A * | 2/1990 | Barish | 408/230 |
| 6,585,460 B1 * | 7/2003 | Meece et al. | 408/230 |
| 6,739,809 B2 * | 5/2004 | Shaffer | 408/230 |

FOREIGN PATENT DOCUMENTS

| | | |
|---|---|---|
| DE | 202 11 589 | 1/2004 |
| DE | 203 04 580 | 8/2004 |
| EP | 818263 A1 * | 1/1998 |
| JP | 08039318 A * | 2/1996 |

OTHER PUBLICATIONS

International Search Report for PCT/IB2006/051518 mailed Dec. 20, 2006.

* cited by examiner

*Primary Examiner* — Daniel Howell
(74) *Attorney, Agent, or Firm* — Nixon & Vanderhye P.C.

(57) ABSTRACT

A drill point (1) for drilling sandwich panels (100), composite materials and similar, comprising a shank (2) for coupling into the chuck a tool apt to drive said point (1) in rotation; a drilling member, integral to the shank, comprising a substantially cylindrical working portion (3), and a cutting head (4), located at the end of the working portion (3), having cutting edges (C); wherein onto the surface of the working portion (3) there are obtained helical flutes (5), spirally arranged about a substantially central longitudinal axis (A-A) of the working portion (3), the flutes (5) ending on a top face (4') of the cutting head (4), characterized in that the constructive geometry thereof provides a helix angle (ε) with respect to the longitudinal axis (A-A), along which there develop the helical flutes (5), substantially comprised in a range of 30° to 35°.

8 Claims, 8 Drawing Sheets

TEST 3. Al-Ti-Al package. Hole diameter: 6,339 – 6,384 mm

| ID | Packages | | Required Hole diameter | Process | (measured) Diameter of test tool | QTY | (measured) post-test hole diameter | Measured Burr (mm) min-max | Ø1 Point diameter Reparameterized for production | Internal Diameter of point-driving bushing, reparameterized for production |
|---|---|---|---|---|---|---|---|---|---|---|
| | Stack-up | Tot Th (mm) | | | | | | | | |
| 3 | 6(AL) +13(AL) + 8(TI) + 6(AL) | 33 | 6,384 6,339 Δ = 0,045 | Pre-drilling ω = 800 mm/min v=0,07 mm/ren | 5,998 | 25 | 6,382 (max) 6,350 (min) Δ = 0,032 | 0,05 – 0,07 | 6,00 5,990 | 6,00 +0 +0,02 |
| | | | | Reaming ω=450 mm/min v=0,05 mm/ren | 6,335 | 25 | | | 6,335 6,325 | 6,335 + 0,005 +0,010 |

TEST 5. Al-Ti-Al package. Hole diameter: 9,514 – 9,559 mm

| ID | Packages | | Required Hole diameter | Process | (measured) Diameter of test tool | QTY | (measured) post-test hole diameter | Measured Burr (mm) min-max | Ø1 Point diameter Reparameterized for production | Internal Diameter of point-driving bushing, reparameterized for production |
|---|---|---|---|---|---|---|---|---|---|---|
| | Stack-up | Tot. Th (mm) | | | | | | | | |
| 5 | 6(AL) +13(AL) + 8(TI) + 6(AL) | 33 | 9,559 9,514 Δ = 0,045 | Pre-drilling ω = 800 mm/min v=0,07 mm/ren | 9,094 | 80 | 9,572 (max) 9,530(min) Δ = 0,042 | 0,04 – 0,006 | 9,10 9,00 | 9,100 +0 +0,02 |
| | | | | Reaming ω=450 mm/min v=0,05 mm/ren | 9,518 | 80 | | | 9,510 9,500 | 9,510 + 0,005 + 0,010 |

DRILL POINT FOR ONE-SHOT DRILLING OF SANDWICH PANELS AND SIMILAR

This application is the U.S. national phase of International Application No. PCT/IB2006/051518 filed 15 May 2006 which designated the U.S. and claims priority to Italian Patent Application No. RM2005A000238 filed 13 May 2005, the entire contents of each of which are hereby incorporated by reference.

The present invention refers to a drill point and a drilling tool incorporating such a point.

In particular, with reference to a more specific embodiment thereof, the present invention introduces a drill point of special-micrograin hard metal, particularly suitable for drilling and milling package-shaped panels, so-called sandwich panels, and/or composite ones, where there is a stack-up of heterogeneous materials.

A drill point according to the present invention finds ideal employ in the aeronautical field, in the manufacturing processes of structures for aircrafts and the like, where by now the use of innovative multilayer sandwich and/or composite materials exhibiting optimal features of lightness of weight, response to stresses and strength, for making, e.g., fuselage paneling and control surfaces, is widespread.

In the current state of the art, the drilling of panels used for building aircrafts and the like implies complex procedures envisaging the use of a plurality of points, each point specialized for each typology of material constituting each respective layer of the sandwich package or composite panels.

Owing to the complexity intrinsic to said drilling process, bothersome and uneconomical problems of organization and production logistics are yet to be solved.

In fact, tool point replacement for the subsequent drilling of respective specific material remarkably lengthens production processes, creating complications to the operators who typically have to manually replace the points used in sequence on sites set at several metres off the ground.

Moreover, subsequent shots through the stack-ups of a panel, by several points apt to reach respective depths, generate ovalization of the generally obtained hole, given the inaccuracy problems such as the non-concentricity of the holes produced for each subsequent shot.

Accordingly, roughnesses created on the walls of the resulting hole and the burr produced at the coming out of each subsequent point add up.

Under these conditions, attaining holes complying with the tolerances set by strict and extremely conservative aeronautical rules proves quite arduous and expensive in terms of time and resources.

The most bothersome drawback that may be found in case of a non-workmanlike drilling is the less than perfect coupling between the rivets like, e.g., pop rivets, and the holes that should constitute the respective seats thereof for creating the connection.

Such a drawback is invariably solved with repetitive manual finishing so as to fall within set tolerances, with very lengthy finishing times.

E.g., the creation of a hole with a 7.9 mm diameter on a three-layer Ti—Al—CFC (Carbon Fiber Composite) sandwich panel, and a 100° countersink, with the current drilling technologies requires times and steps summarized in the following scheme:

| 1) Pre-drilling | ⌀ 4.8 | 12 min time; |
| 2) Pre-drilling | ⌀ 6.3 | 10 min time; |
| 3) Pre-drilling | ⌀ 7.5 | 8 min time; |
| 4) Reaming | ⌀ 7.7 | 10 min time; |
| 5) Reaming | ⌀ 7.890 | 12 min time; |
| 6) Countersinking | 100° | 8 min time; |

The time spent for carrying out said steps is of 60 minutes, without attaining the minimum tolerances required.

To date, it would be exceedingly desirable to fully benefit from the potentialities offered in terms of simplicity of application and rapidity of execution by the new extremely fast and accurate numerical control machines, applied to the drilling process in the aeronautical field, without however having this translate into scarce acceptability of the result with the onset of drawbacks such as excessive roughness and burr coming out onto the edge of the holes.

At present, there is no individual point capable of drilling a hole in one shot through a sequence of thicknesses of respectively different materials, as in the case of multilayer panels, in a substantially perfect manner, without onset of ovalization and excessive roughness, in compliance with the rules in force, until attaining an h7 tolerance; then to jointly obtain a countersink perpendicularly to the hole made; without however having burr residues left over during the coming out of the point.

Hence, object of the present invention is to solve said problems, by proposing a drill point as defined in claim 1.

Further object of the present invention is to provide a drilling tool incorporating such a point, as introduced in claim 8.

Additional features of the device and system according to the present invention are defined in the dependent claims thereof.

The drill point according to the present invention is proposed on the market of reference, assuring the solving of the abovementioned problems in the drilling technique of sandwich packages.

The drill point according to the present invention, thanks to a specific synergy between the geometric quantities of construction and the specific point sharpening, allows a smooth and accurate drilling of package panels reducing the number of steps to a minimum, with the one-shot drilling of a plurality of thicknesses made of a respectively different material, without scratching the machined surface and without exhibiting burr defect.

These features give an unique character to the point, differentiating it from the currently marketed points also by virtue of the quality of the work carried out and of the life in terms of work cycles.

The point, synergistically with the technological innovation that has made available extremely effective numerical control machines, overcomes the current problems inherent to manual production process, making the drilling operation conclusive in the first instance, effective and efficient.

The peculiar dimensioning of the specific constructive geometric quantities of the point according to the present invention yields a functional synergy such as to produce a tool assuring a universal burr-free one-shot drilling of the package panels, and in general the attainment of technological results capable of radically transforming the entire production process of aeronautical structures and the like, substantially simplifying its steps and abating its costs.

Other advantages, features and the operation modes of the present invention will be made apparent from the following description of a preferred embodiment thereof, given by way of example and without limitative purposes.

In particular, in the following discussion, reference is made to a specific application of the present invention in the aeronautical field, it being however evident that the present invention could anyhow find application in other and different applicative sectors, in which there be the same technical problem of drilling in one shot a plurality of thicknesses made of respectively different materials.

Reference will be made to the drawings of the annexed figures, wherein.

To describe the present invention, hereinafter reference will be made to the above-indicated figures.

Figure 3:
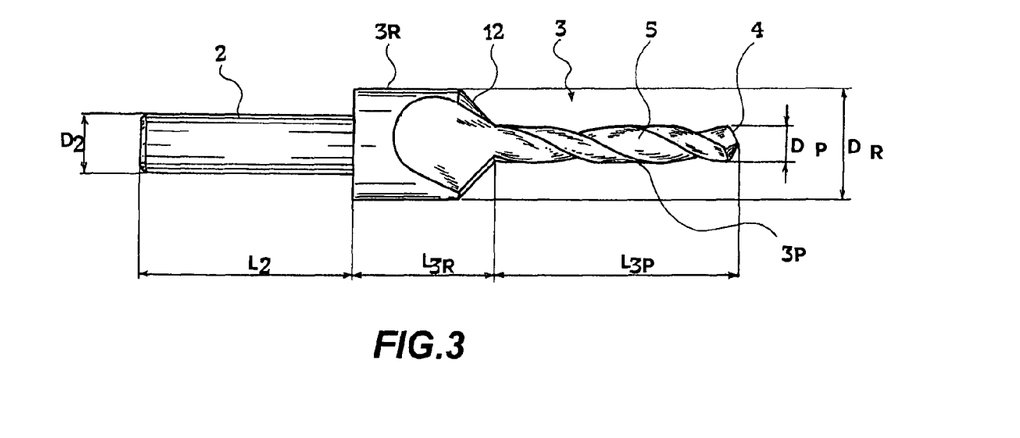
FIG. 3 is an overall plan view of said preferred embodiment of the drill point according to the present invention, apt to illustrate the component parts thereof.
Figure 4:
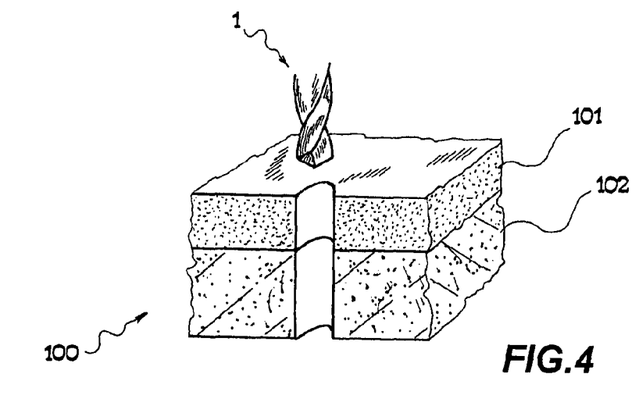
FIGS. 4 and 5 are partially sectional perspective views, exemplifying two respective drillings carried out by means of the drill point of FIG. 3 on respective multilayer panels.
Figure 5:
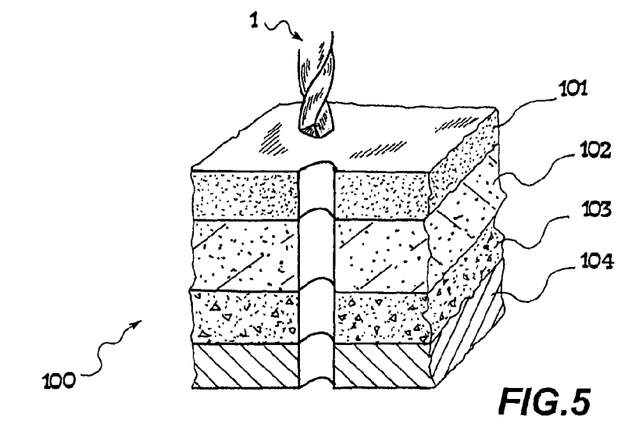

Referring to FIGS. 3, 4 and 5, a drill point 1 for drilling sandwich panels 100, composite materials and similar, comprises a shank 2, typically for coupling into the chuck a tool apt to drive the point 1 in rotation; and a drilling member, integral to the shank 2.

The geometry of the shank is designed so as to bring about a perfect self-centering and foster a rapid assembling in the toolholder at zero set level.

For this purpose, the shank 2 has diameter $D_2$ comprised in a range of 6 mm to 20 mm and length $L_2$ comprised in a range of 25 to 100 mm.

Said drilling member comprises, as it is conventional for helical drill points, a substantially cylindrical working portion 3; and a head 4, located at the end of the working portion 3, that, having cutting edges C, actually carries out the cuffing.

Figure 1:
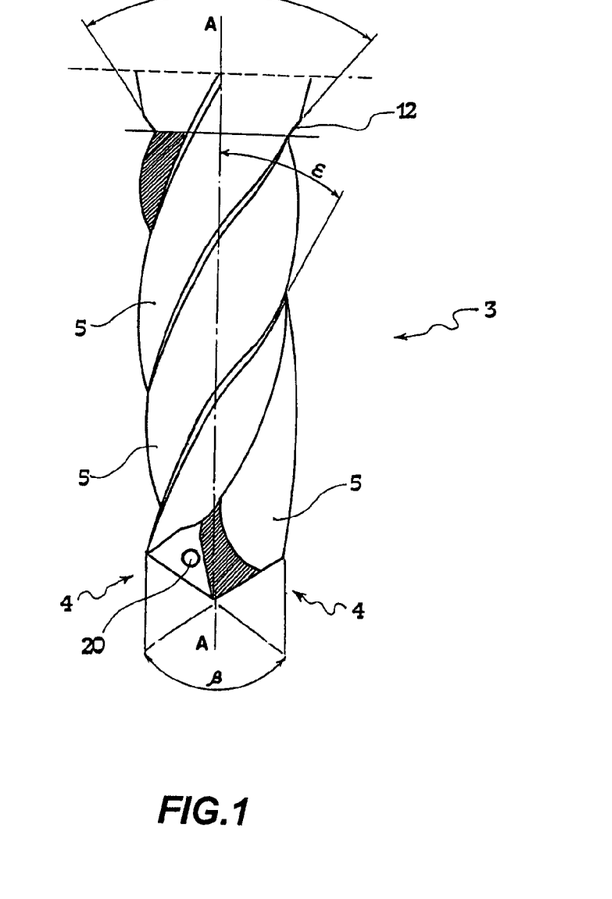
FIG. 1 is a vertical perspective view of a drilling member of a preferred embodiment of the drill point according to the present invention, apt to highlight some first characteristic constructive quantities thereof.
Figure 2:
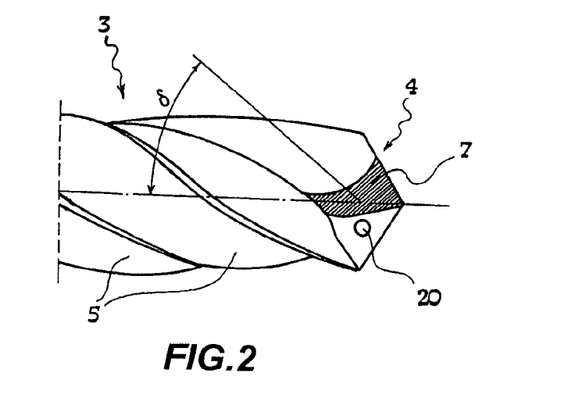
FIG. 2 is a horizontal perspective view of a portion of the drilling member of FIG. 1, apt to highlight additional second characteristic constructive quantities thereof.

As it may be found in detail in FIGS. 1 and 2, onto the surface of the working portion 3 there are obtained helical flutes 5, spirally arranged about a substantially central longitudinal axis A-A of the working portion 3.

The substantially cylindrical working portion 3 comprises a first structural reinforcement part $3_R$, apt to transmit to the top portion the torque developed by the drilling tool and collected directly by the shank 2; and a second part $3_P$ for gradually penetrating into the hole.

Said first structural reinforcement part $3_R$ has a diameter $D_{3R}$ preferably comprised in a range of 11 to 20 mm and a length $L_{3R}$ preferably comprised in a range of 15 to 25 mm.

The second penetrating part $3_P$ has a diameter $D_{3P}$ preferably comprised in a range of 3 to 10 mm and a length $L_{3P}$ preferably comprised in a range of 8 to 47 mm.

The helical flutes 5 end by relieving bottomwise on a top face 4' of the cutting head 4 and topwise onto the abovementioned structural reinforcement part $3_R$.

The drill points are characterized by means of a given number of constructive and dimensional parameters.

The geometry of the point was developed for use on numerical control machines and it carries out a finished one-shot drilling, complete with countersink, on sandwich package panels.

Such panels are made up, as schematically depicted in FIGS. 4 and 5, of different thicknesses 101-104 of respective material, coupled in variable combinations, e.g. according to light alloy-light alloy or light alloy-titanium-light alloy packing modules.

Typically, the light alloys used in the aeronautic construction field and the like are Aluminum-(Al-)based, e.g. 2024-T3 or 7050, whereas the Titanium alloys in use comprise, by way of example, the alloy Ti6Al4V.

In the aeronautical field, e.g., currently for the manufacturing of structures there are used high-technology Al/Al; Al/Ti; CFCl—Al; CFC—Ti (CFC being the acronym of carbon fiber composites) sandwich packages; CFC—CFR (CFR being the acronym of carbon fiber-reinforced metal matrix composites); or GLARE laminates (glass reinforced Aluminum laminates) comprising Aluminum and prepreg layers of high-strength glass fibers.

The point according to the present invention was contrived and dimensioned for an optimized drilling in all of said typologies of sandwich and/or composite packages.

The point was manufactured thanks to an advantageous union between the exceptionality of the mechanical features of the special-micrograin hard metal used, and the technical effect performed by the synergy of the constructive parameters selected, apt to define the geometry of the point.

The resulting invention is apt to solve the foreshadowed technical difficulties encountered by the tools encompassed by the state of the art in the field of drilling tools.

The drill point 1 according to the present invention is characterized by a helix angle $\epsilon$ with respect to the longitudinal axis A-A, along which there develop the helical flutes 5, substantially comprised in a range of 30° to 35°.

The pitch of the helix and its angle $\epsilon$ vary depending on the machined material and proportionally to the dimensions of the diameter of the point 1, therefore of the hole that is to be obtained, and to the length of the point 1. Hence, said range allows a suitable adjusting to contingent machining conditions.

Such a dimensioning of the helix angle $\epsilon$ optimally fosters the smooth outflow and the subsequent disposal of the chip material resulting from the drilling, advantageously preventing damage to the surface of the point 1 and/or to the surface of the material subjected to drilling.

As a result, extended life of the point 1 and improved machining of the drilled material are attained.

The chip, by inserting into the flutes 5 and following their path in a direction opposite to that of the feed of the point 1, does not interfere with the cutting operations and visually appears far from the machining zone.

Figure 7:
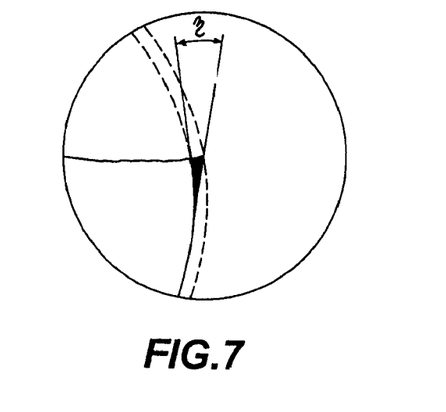
FIG. 7 is an enlarged detail of the plan view of the cutting head of FIG. 6, apt to allow the detection of a fourth characteristic constructive quantity.

The drill point 1 according to the present invention is further characterized by a chisel edge angle $\eta$ substantially comprised in a range of 1° to 5°.

The chisel edge angle $\eta$ is a contact angle included between chisel edge and cutting edge C of the point 1, when seen from the end of the point 1.

The range defined above for the chisel edge angle η allows a soft removal of the chip, thanks to the fact that onto the diameter walls of the hole being made it touches solely the profile of the cutting edge C.

The cutting edge C, by remaining always positively sharp, leaves smooth the hole walls, avoiding machining traces onto the latter.

Figure 6:
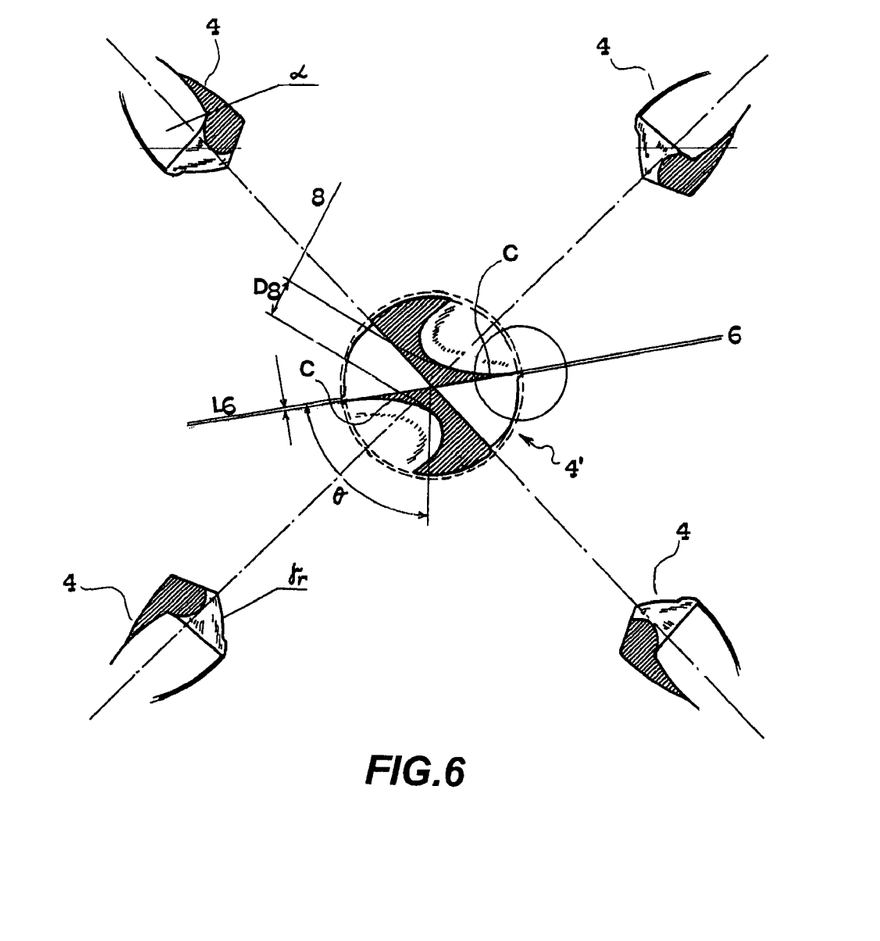
FIG. 6 comprises a plurality of perspective views of the cutting head of the drilling body of FIG. 1, and centrally a plan view of said cutting head, apt to highlight additional third characteristic constructive quantities.

The point 1 according to the present invention is further characterized by a first radial relief angle $\gamma_r$, included between a face 6 of the cutting edge C and the radial direction of the point, substantially of 7°; and a second external relief angle $\alpha$, defined between the side flank of the cutting edge C and the direction tangential to the circumference circumscribed to the cutting edges, substantially comprised in a range of 22° to 26°.

The face 6 of the cutting edge C, for raising and letting flow a chip deriving from the drilling action, has length $L_6$ substantially and advantageously comprised in a range of 0.3 to 0.5 mm.

The inferior relief angle $\delta$ of the helical flutes 5 onto the cutting head 4 with respect to the longitudinal axis A-A is substantially implemented of about 25°; whereas the angle θ included between the face 6 and the relief 7 of the flutes 5 onto the head 4 is advantageously designed as substantially comprised in a range of 70° to 80°.

The central core 8 of the point 1 has diameter $D_8$ substantially comprised in a range of 1.5 to 2.7 mm, as shown in FIG. 6; whereas, from the general viewpoint of the synergistic effect performed by the peculiar selection of the values for the constructive parameters necessary for manufacturing the point 1 according to the present invention, the sharpening angle β of the head 4 of the point 1 is substantially comprised in a range of 110° to 150°.

In a preferred embodiment, the sharpening angle β is of 130°.

The drilling member of the present invention may provide the option of a countersink portion 12, in a position substantially opposite to said cutting head 4, optionally integrated into the first structural reinforcement part $3_R$ in the form of a taper having decreasing diameter in the sense of penetration of the point 1.

In a preferred embodiment of the present invention, the countersink portion 12 has a countersink angle λ substantially of 100°.

Thanks to such a countersink portion, when needing to make junctions on the drilled panels 100, there are created housings apt to house respective heads of connecting members, such as rivets and the like, maximally limiting edge effects.

The drill point 1, preferably of micrograin-submicrograin hard metal, may further comprise lubrication-cooling channels defining paths extending along at least part of the substantially cylindrical working portion 3, and having outlet 20 in correspondence of the cutting head 4.

Said lubrication-cooling may, e.g., be of "spray mist" type, i.e. an air one with the addition of liquid lubricant.

Said features carry out a virtuous cooperation, thereby providing a positive synergistic effect such as to allow the one-shot drilling of sandwich panels 100 and/or panels of composite material and similar, in full compliance of the tolerances set by the rules and/or preset by the design.

During the drilling step, the cutting edges undergo marked shearing and compression stresses, worsened in the case of sandwich package panels by discontinuities of machining conditions, generated by the fact that the point 1 encounters thicknesses of different materials having respective mechanical features.

In spite of the relevance of the stresses that develop, the point 1 keeps unaltered its functionality for considerable numbers of machining cycles.

On the basis of the tests carried out, a single point 1 allows to make from 6,000 up to 12,000 holes for Al/Al packages, and from 60 to 400 holes for Al/Ti or Ti/CFC packages.

Thus, there are advantageously avoided cumbersome replacements of tools during the machining.

Thanks to the selection of the high-performance material, a micrograin metal exhibiting a hardness, measurable in terms of Rockwell and Vickers scales, of HRC 94-102 and HV 1600-1800, respectively, and to the optimization of stress distribution attained by virtue of the particular geometric synergy of construction, it is assured a lengthy life of the drill point 1 according to the present invention.

Moreover, such a life is made easier by a soft removal mode of the chip, followed by a ready outflow of the chip, in a segmented and twisted form, from the machined material.

The combination of said two factors advantageously allows to keep very low the temperature of the point 1, also for machining with HSC (high-speed cutting) technology, required in the instance examined here by way of example.

In the drilling of Aluminum alloys, the point 1 allows the attainment of a cutting speed of 18,000 to 20,000 rpm, with advances (feeds) into the panels of up to 180 to 200 mm/min; whereas in the drilling of Titanium alloys, the point 1 allows the attainment of a cutting speed of 800-1,100 rpm, with advances into the panels of up to 20 to 30 mm/min.

The development of the helix and of the cutting edge as designed, in cooperation with the above-introduced constructive parameters, are fundamental to perform drillings through different typologies of materials without generating ovalization, with strict accuracy margins up to h7 tolerance, optionally integrating a countersink perpendicularly to the hole and without burr residues flowing out.

The effectiveness of the point 1 is confirmed by experimental laboratory tests.

In the case at issue, dry drilling tests, i.e., without liquid lubricating-cooling agents, were performed in an automated test cell with a Cartesian robot, on tiles having a maximum thickness of 38 mm, apt to represent packages comprising three thicknesses of different material: light alloy 2024-T3, Titanium Ti6A14V, and light alloy 7050, respectively.

Figure 8:
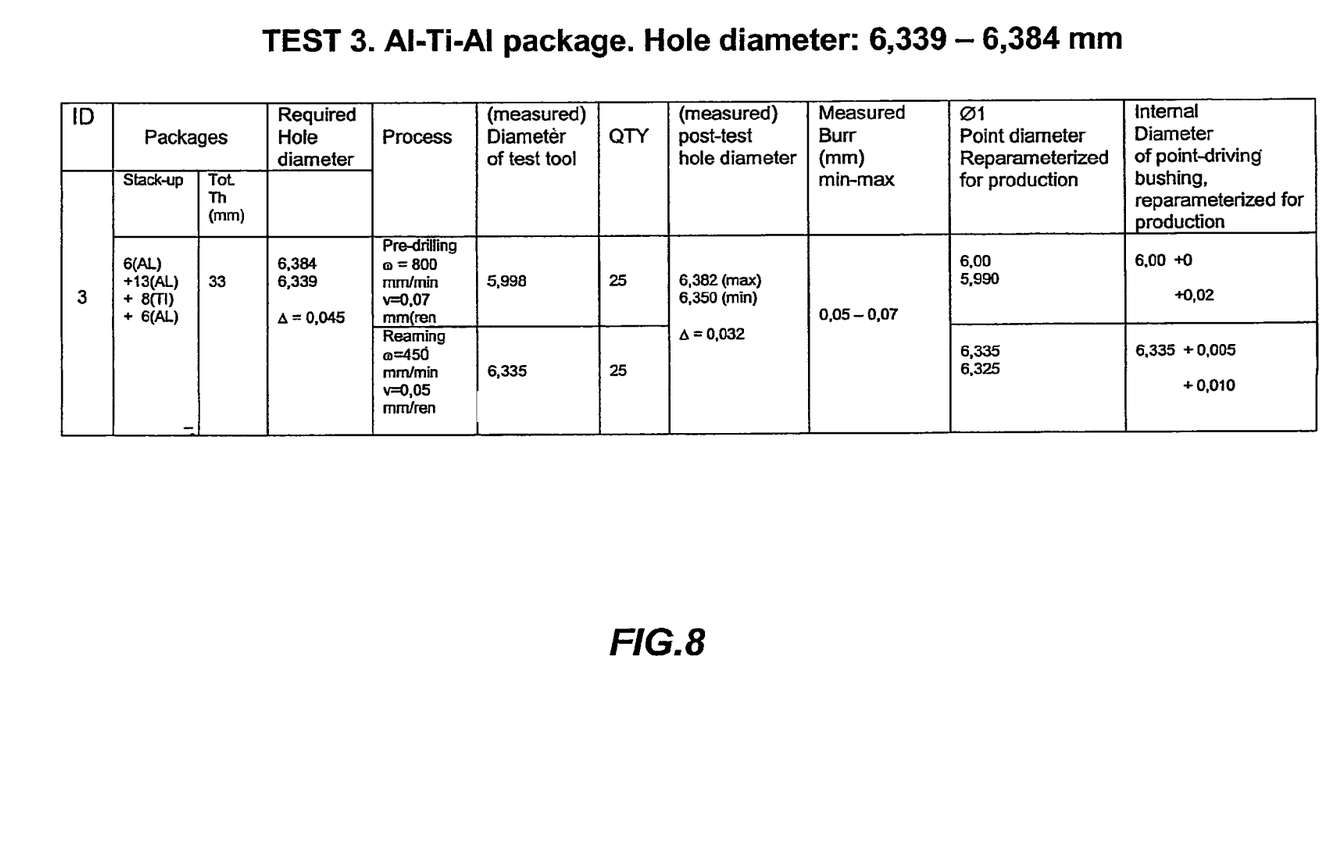
FIGS. 8 to 12 report tables and diagrams related to experimental texts carried out for assessing the performances of the drill point according to the present invention.
Figure 10:
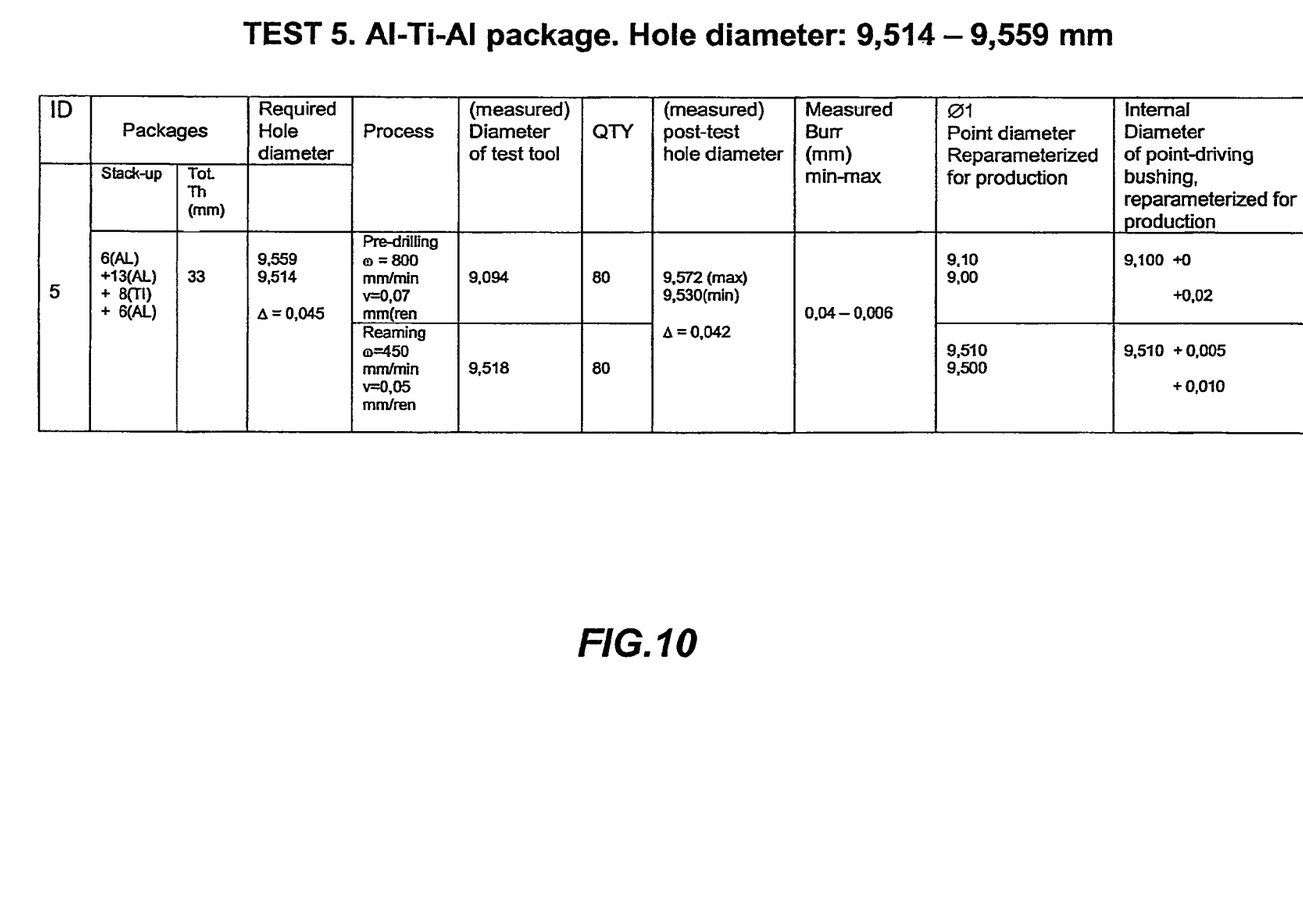

In FIGS. 8 and 10 there are reported, tabled, the drilling specifications related to a first and a second drilling test, to obtain a hole with a diameter of 6.339 to 6.384 mm and of 9.514 to 9.559 mm, respectively.

Therein, there are reported the dimensional parameters of the point 1 and the machining parameters thereof, such as its feed rate and rotation speed.

Figure 9:
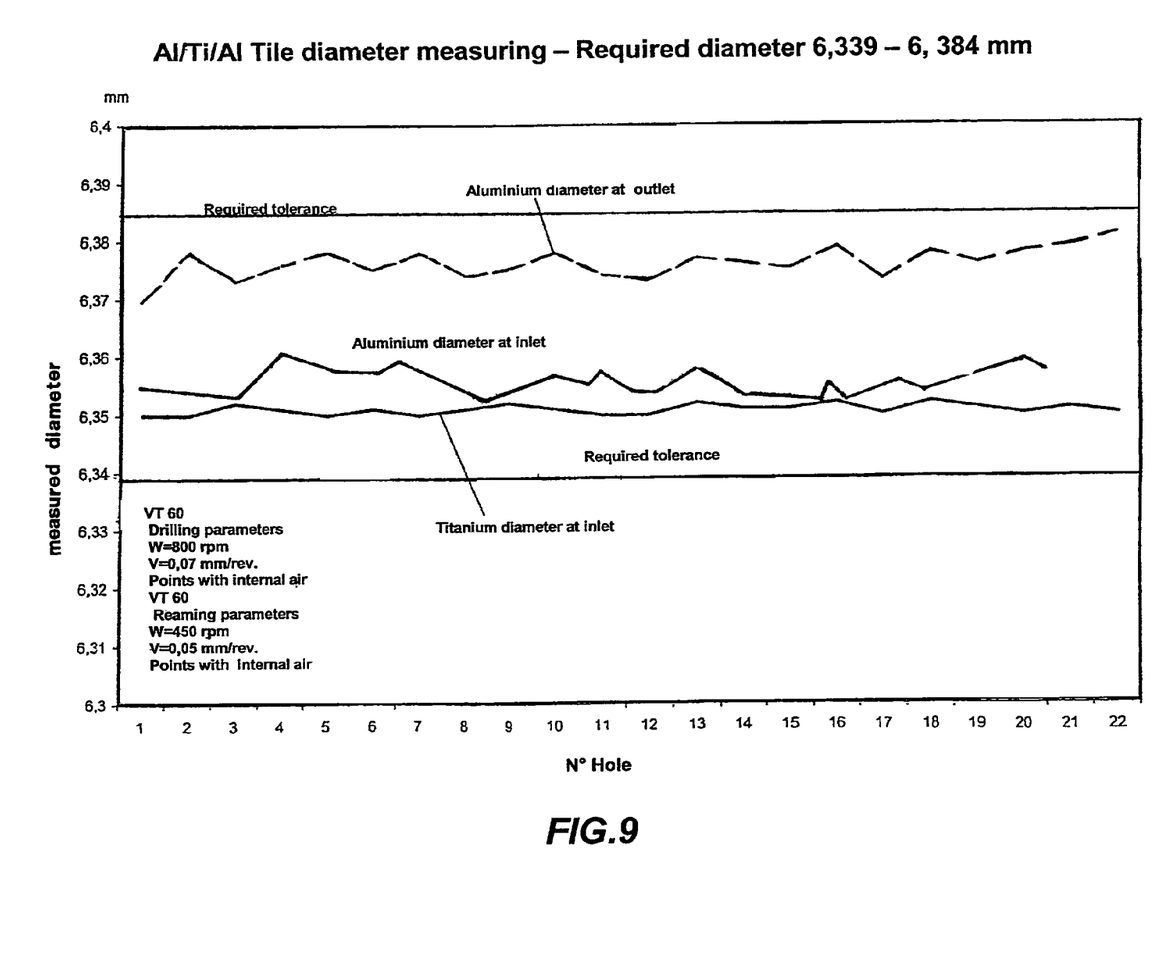
Figure 11:
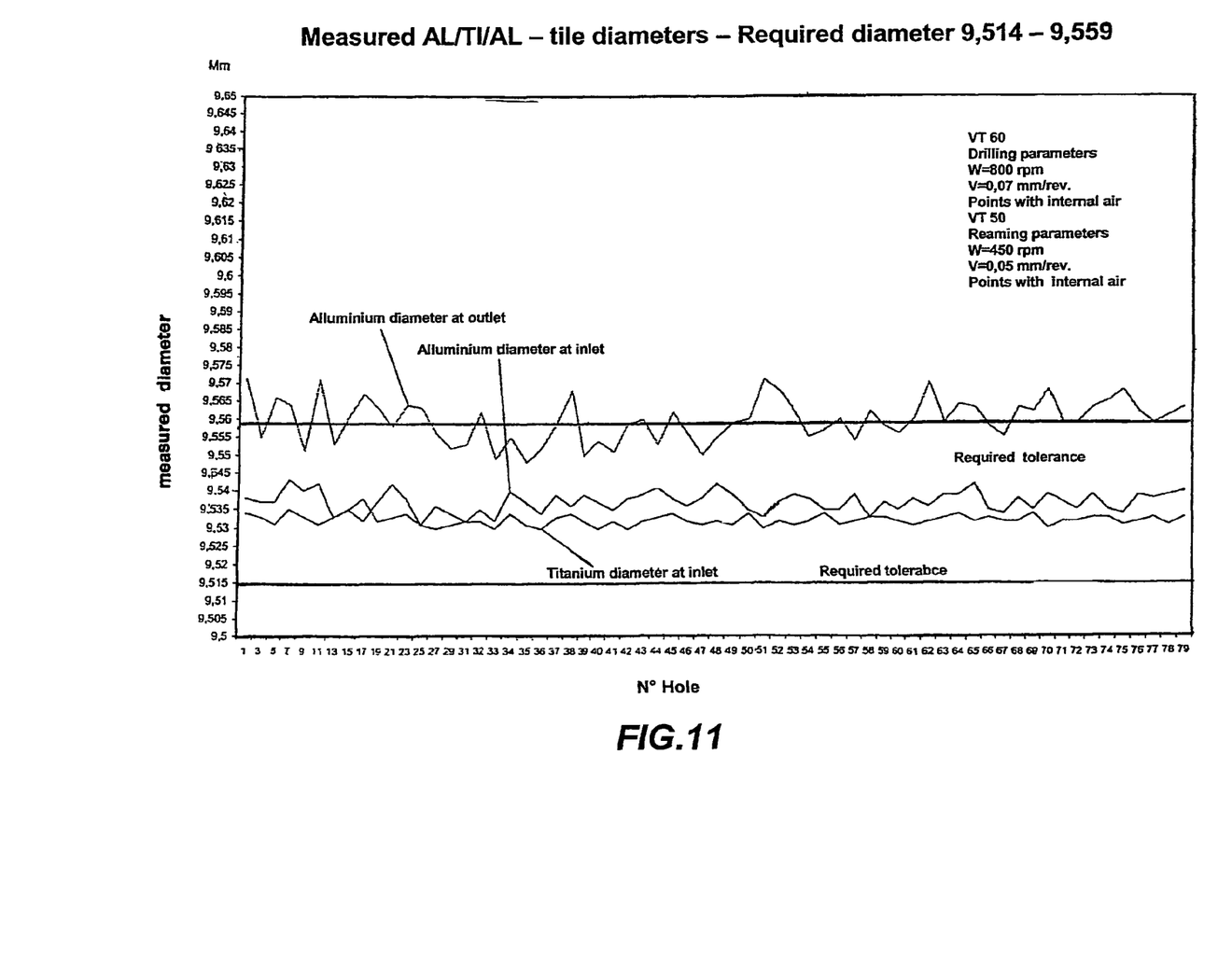

With regard to said first and second drilling test, there are also reported the corresponding diagrams, in FIG. 9 and in FIG. 11, respectively, apt to display in the form of a graph the measuring of the drilling diameters obtained, compared with the tolerances set by design.

Figure 12:
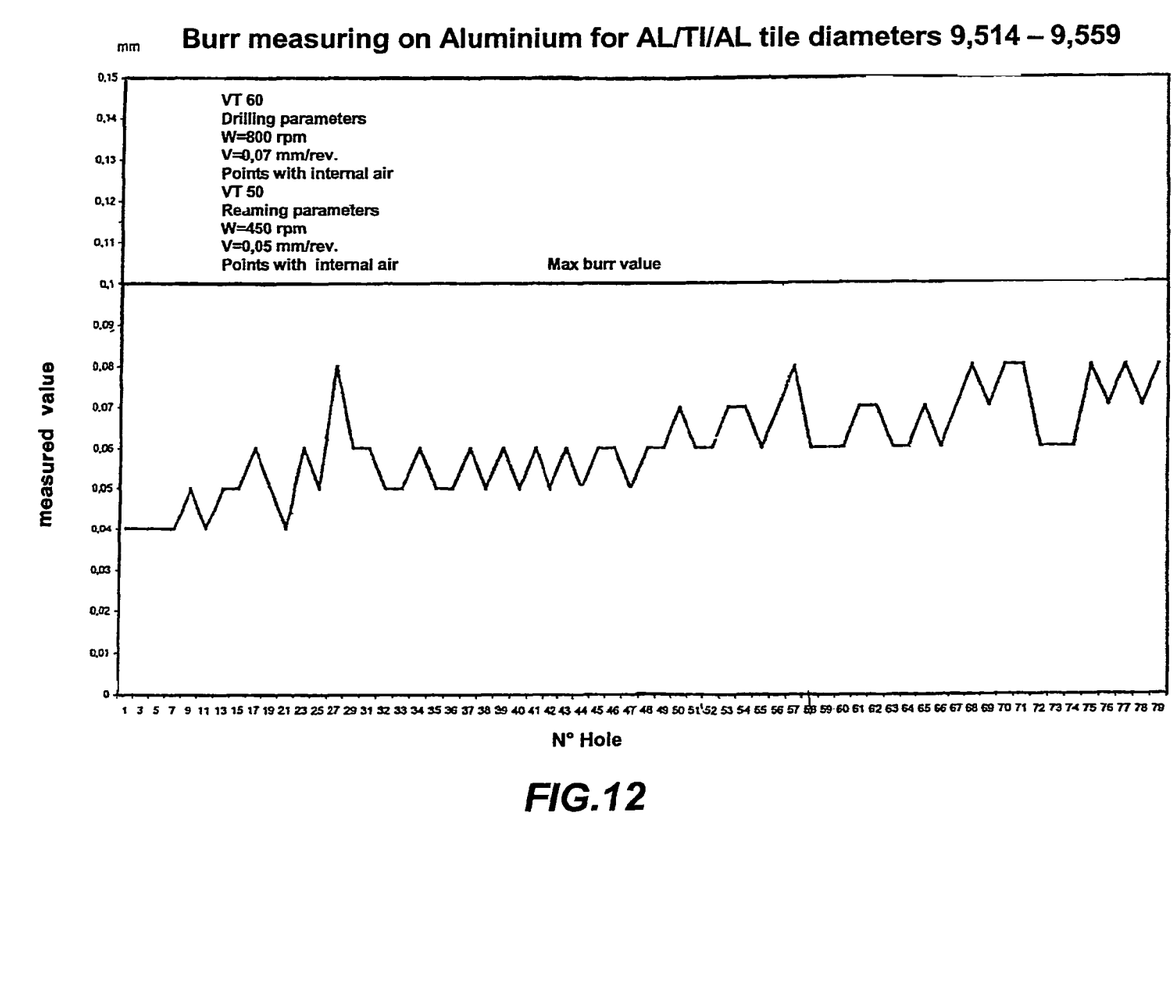

Moreover, in FIG. 12 and with reference to said second drilling test, it is shown a diagram reporting burr measuring at the holes obtained, compared to the maximum burr value admitted.

From said figures, it is evident that the behavior of the point 1 optimally solves the technical problem underlying the present invention.

By way of example, the measuring of the quantities apt to characterize the performances of a drill point, carried out upon completion of the tests, on average yielded the following values, indicative of the machining accuracy:

roughness: about 1.6 µm;
hole verticality with respect to a reference plane: ±1°;
coaxiality between hole and countersink: ±0.5°;
concentricity between hole and countersink: ±0.02 mm;
countersink angle: 100°±0.5°;
burr: <0.1 mm;
hole tolerance: 0.01±0.05 mm.

The point 1 proves useful and with high performances in forefront fields such as the aeronautic one, in which the tools used, due to compliance to strict tolerances set by the controlling bodies and severity of the stresses to be endured, should necessarily incorporate a high technological value.

The drill point 1 according to the present invention proves decisive for drilling paneling comprising stack-up of different materials, by eliminating all of the intermediate drilling steps and manufacturing instead, with a one-shot process, a one-shot finished hole, complete with countersink, without the drawback of burr and with a surface finish substantially perfect to visual inspections and instrumental detections.

The drill point 1 according to the present invention is susceptible of being mounted on numerical control machines and proves ideal for drilling critical and particularly thick zones, such as fuselage lap joint zones.

The present invention has hereto been described according to a preferred embodiment thereof, given by way of example and without limitative purposes.

It is understood that other embodiments could be envisaged, all to be construed as falling within the protective scope thereof, as defined by the annexed claims.

The invention claimed is:

1. A drill point (1) for drilling sandwich panels (100), composite materials and similar, comprising:
    a shank (2) for coupling into the chuck a tool apt to drive said point (1) in rotation;
    a drilling member, integral to said shank, comprising:
        a substantially cylindrical working portion (3),
        a cutting head (4), located at the end of said working portion (3), having cutting edges (C);
        wherein onto the surface of said working portion (3) there are obtained helical flutes (5), spirally arranged about a substantially central longitudinal axis (A-A) of said working portion (3), said flutes (5) ending on a top face (4') of said cutting head (4),
    characterized in that the constructive geometry thereof provides:
        a helix angle ($\epsilon$) with respect to said longitudinal axis (A-A), along which there develop said helical flutes (5), substantially comprised in a range of 30° to 35°;
        a chisel edge angle ($\eta$) substantially comprised in a range of 1° to 5°;
        a first radial relief angle ($\gamma_r$) substantially of 7°;
        a second external relief angle ($\alpha$) substantially comprised in a range of 22° to 26°;
        an inferior relief angle ($\delta$) of said helical flutes (5) on said cutting head (4) with respect to said longitudinal axis (A-A) substantially of about 25°;
        a section of said cutting head (4), commonly known as face (6), for raising and letting flow a chip deriving from the drilling action, having length ($L_6$) substantially comprised in a range of 0.3 to 0.5 mm;
        an angle ($\theta$) included between said face (6) and the relief (7) of said flutes (5) on said head (4) substantially comprised in a range of 70° to 80°;
        a central core (8) of said point (1) with diameter ($D_8$) substantially comprised in a range of 1.5 mm to 2.7 mm;
        a sharpening angle ($\beta$) of the head (4) of said point (1) substantially comprised in a range of 110° to 150°;
    so as to carry out a one-shot drilling of said sandwich panels (100), composite materials and similar.

2. A drill point (1) according to claim 1, wherein said sharpening angle ($\beta$) is of 130°.

3. A drill point (1) according to claim 1, further comprising lubrication-cooling channels, defining paths extending along at least part of said substantially cylindrical working portion (3) and having outlet (20) in correspondence of said cutting head (4).

4. A drill point (1) according to claim 1, wherein said drilling member comprises a countersink portion (12), in a position substantially opposite to said cutting head (4).

5. A drill point according to claim 4, wherein said countersink portion (12) has a countersink angle ($\lambda$) substantially of 100°.

6. A drill point (1) according to claim 1, of micrograin-submicrograin hard metal.

7. A drill point according to claim 1, wherein:
    said shank (2) has diameter ($D_2$) comprised in a range of 6 to 20 mm and length ($L_2$) comprised in a range of 25 to 100 mm; and
    said substantially cylindrical working portion (3) comprises a first structural reinforcement part ($3_R$) onto which said helical flutes (5) relieve topwise, optionally apt to make said countersink (12), having a diameter ($D_{3R}$) comprised in a range of 11-20 mm and a length ($L_{3R}$) comprised in a range of 15 to 25 mm; and a second penetrating part ($3_P$) having a diameter ($D_{3P}$) comprised in a range of 3 to 10 mm and a length ($L_{3P}$) comprised in a range of 8 to 47 mm.

8. A drilling tool comprising a drill point (1) such as introduced in claim 1.

* * * * *